Oct. 17, 1950 W. H. RIGHTER 2,526,578
MECHANICAL STARTER FOR AIRCRAFT ENGINES
Filed Dec. 17, 1946 4 Sheets-Sheet 1

INVENTOR.
WALTER H. RIGHTER
BY
James M. Abbott
ATTY.

INVENTOR.
WALTER H. RIGHTER
BY James M. Abbott
ATTY

Oct. 17, 1950     W. H. RIGHTER     2,526,578
MECHANICAL STARTER FOR AIRCRAFT ENGINES
Filed Dec. 17, 1946                                   4 Sheets-Sheet 3
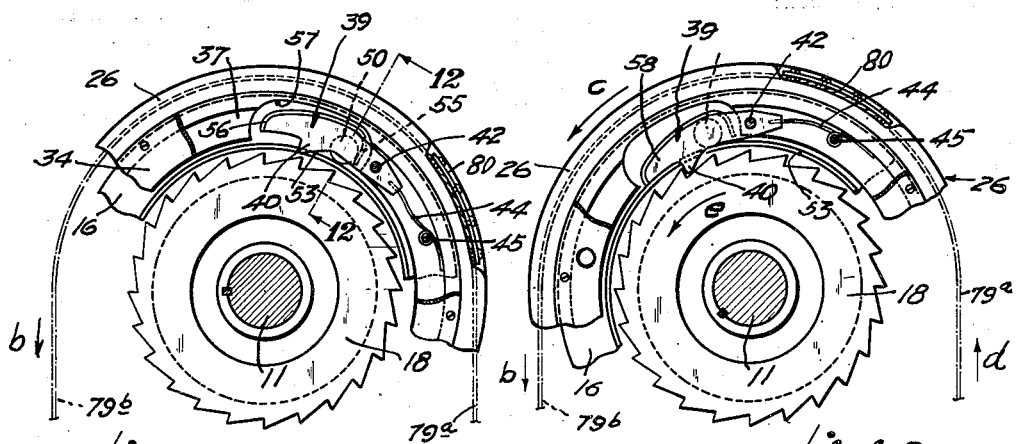
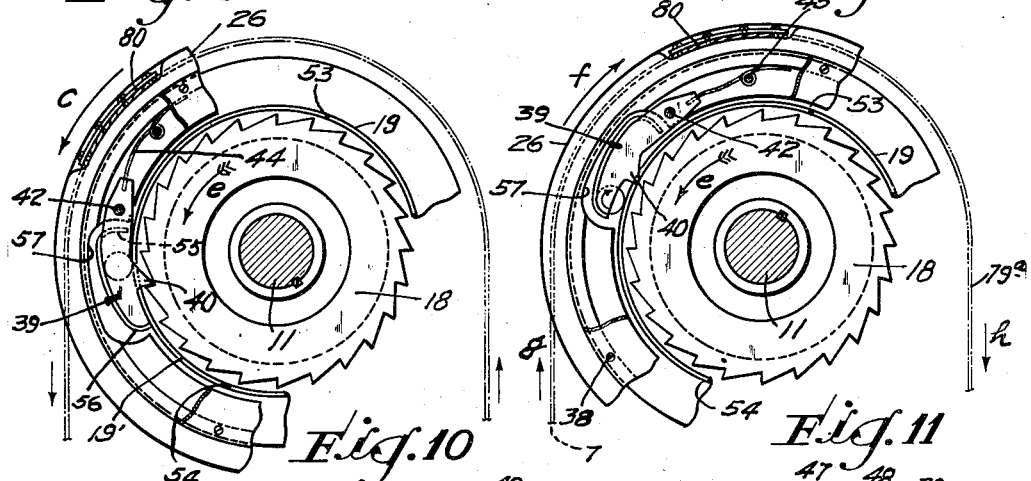
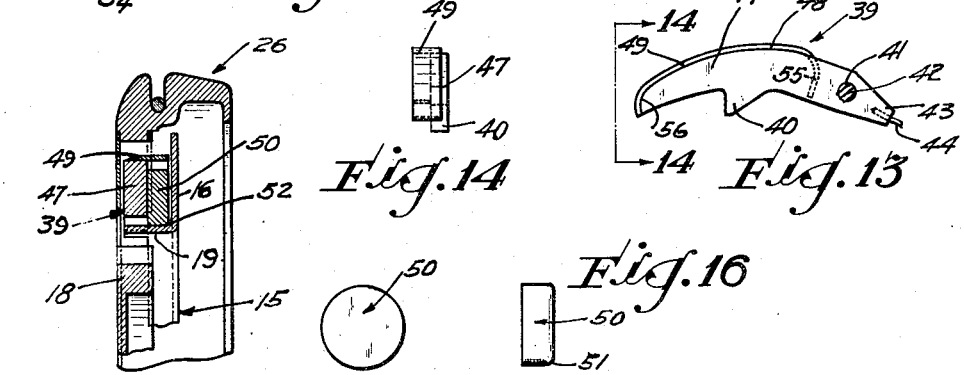
INVENTOR.
WALTER H RIGHTER
BY
James M. Abbett
ATTY

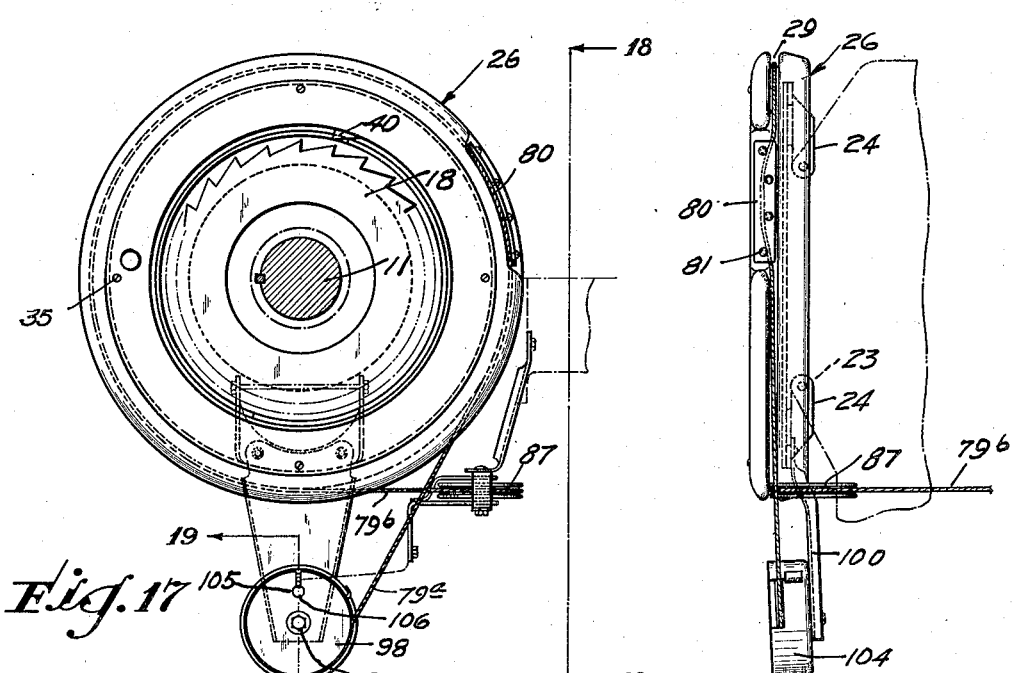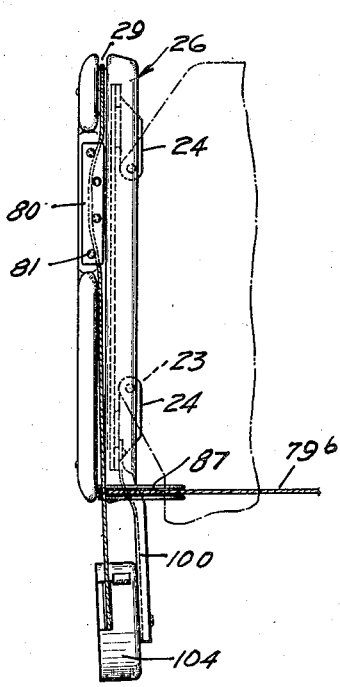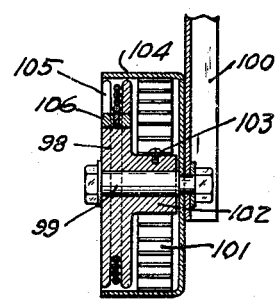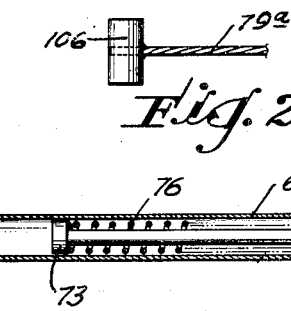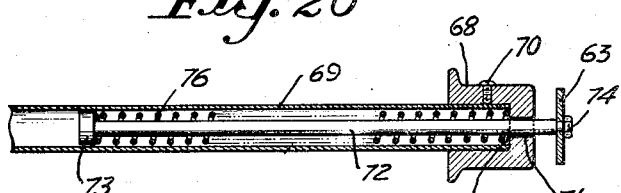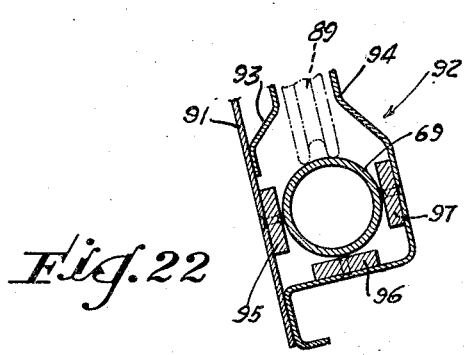
INVENTOR.
WALTER H. RIGHTER
BY James M. Abbett
ATTY.

Patented Oct. 17, 1950

2,526,578

UNITED STATES PATENT OFFICE 2,526,578

MECHANICAL STARTER FOR AIRCRAFT ENGINES

Walter H. Righter, Glendale, Calif.

Application December 17, 1946, Serial No. 716,685

1 Claim. (Cl. 123—185)

This invention relates to internal combustion engines, and particularly pertains to a mechanical starter for aircraft engines.

Aircraft engines have in most instances depended upon the manual spinning of the propeller or the operation of an electric starter to initiate operation of the engine. The practice of manual starting of the engine by spinning the propeller is laborious and dangerous, and the use of an electric starter adds an undesirable additional weight to the load carried by the engine. Both of these practices, however, can be tolerated in the operation of large aircraft but are undesirable in connection with small aircraft, particularly when flown by civilians. In small aircraft it is hazardous for a civilian operator to attempt to start the engine by spinning the propeller, and when using an electric starting unit the weight of the unit adds considerable undesired load to the plane. It is desirable, therefore, to provide a light-weight mechanical starter which can be used in a convenient manner and with safety. It is the principal object of the present invention, therefore, to provide a mechanical engine starter, particularly adapted for installation and use in connection with small aircraft internal combustion engines, said starter structure being easily installed upon existing models of aircraft engines and occupying a small amount of space so that the engine can be started by the pilot while seated within the engine cabin and without danger of injury incident to the starting operation.

The present invention contemplates the provision of a spinning unit which may be easily installed upon the engine frame and associated with the engine crankshaft, said unit being manually operated to spin the engine and being provided with automatic means for insuring that the engine crankshaft will be positively disconnected from the operating means in the event of backfire.

The invention is illustrated by way of example in the accompanying drawings in which:

Fig. 8 is an enlarged fragmentary view in end elevation showing the relation of the starter pawl to the starting ratchet when said elements are in their initial disengaged positions.

Fig. 9 is a fragmentary view similar to that shown in Fig. 8 indicating the starter pawl in its initial engaged position with the ratchet as the starting operation is initiated.

Fig. 10 is a fragmentary view similar to Fig. 8 showing the starter pawl as it approaches the end of its starting operation.

Fig. 11 is a fragmentary view similar to that shown in Fig. 8 indicating the relation of the starter pawl and the ratchet as the pawl is retracted from engagement with the ratchet and returns to its initial position.

Fig. 12 is an enlarged fragmentary section through the pawl clutch mechanism as seen on the line 12—12 of Fig. 8.

Fig. 13 is a view in side elevation showing the starter pawl.

Fig. 14 is a view in end elevation showing the starter pawl and the overhanging cam surface for the clutch roller.

Fig. 15 is a view in end elevation showing the clutch roller.

Fig. 16 is a view in side elevation showing the clutch roller.

Fig. 17 is a view in end elevation showing the assembled starter mechanism and indicates the cable arrangement.

Fig. 18 is a view in elevation as seen on the line 18—18 of Fig. 17 and shows the starter structure.

Fig. 19 is an enlarged view in central vertical section through the cable tension means as seen on the line 19—19 of Fig. 17.

Fig. 20 is a fragmentary view in elevation showing the cable end fitting.

Fig. 21 is a fragmentary view in central longitudinal section through the starter recoil mechanism as seen on the line 21—21 of Fig. 2.

Fig. 22 is an enlarged fragmentary view in transverse section as seen on the line 22—22 of Fig. 2 and shows the guide for the thrust rod.

Figure 5:
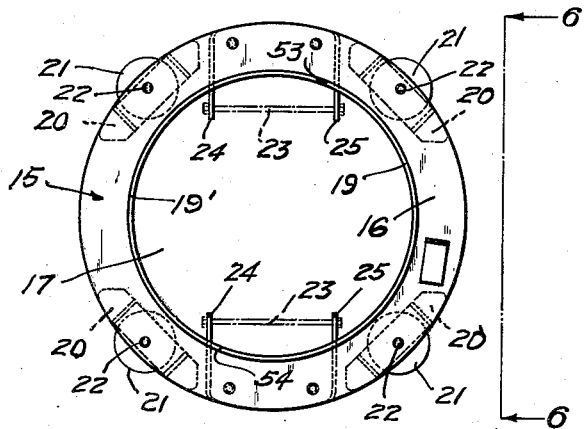
Fig. 5 is a view in front elevation showing the mounting ring for the starter pawl.
Figure 6:
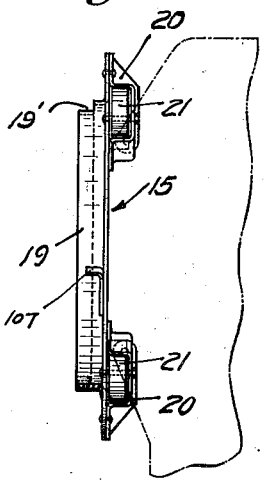
Fig. 6 is a view in elevation as seen on the line 6—6 of Fig. 5 and shows the details of construction of the mounting ring assembly.
Figure 7:
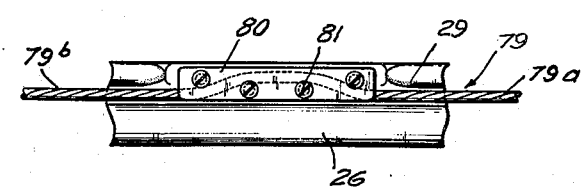
Fig. 7 is an enlarged fragmentary view in elevation showing the cable fastening for the starter.

Referring more particularly to the drawings, 10 indicates an aircraft engine provided with a crankshaft 11 upon which a propeller hub 12 is secured. The propeller hub carries the usual propeller blades 13. The present invention is concerned with means for imparting an initial rotation to the shaft 11 to start the engine. This structure includes a ratchet unit 14 and an operating structure. The ratchet unit is disposed at the front of the engine 10 and comprises a ring mounting 15 which is secured to the end face of engine 10. The ring mounting as shown in Figs. 5 and 6 of the drawing comprises an annular plate 16 circumscribing a central opening 17. The diameter of the opening 17 is greater than the outside diameter of a ratchet wheel 18, which wheel is secured upon the engine shaft 11 at a point between the engine 10 and the hub 12. The mounting ring 15 carries an annular flange 19 which circumscribes the opening 17 and extends at right angles to the plane thereof. This flange is thus cylindrical and projects a desired distance from the outer face of the ring portion 16. Mounted on the back of the ring portion 16 and spaced at desired positions relative to each other are a plurality of bracket members 20. These members have feet which are secured to the back face of the ring portion 16 and an intermediate offset portion which accommodates a roller 21. As shown in Fig. 5 of the drawing, four of these rollers are provided, each being mounted upon a shaft 22.

Figure 3:
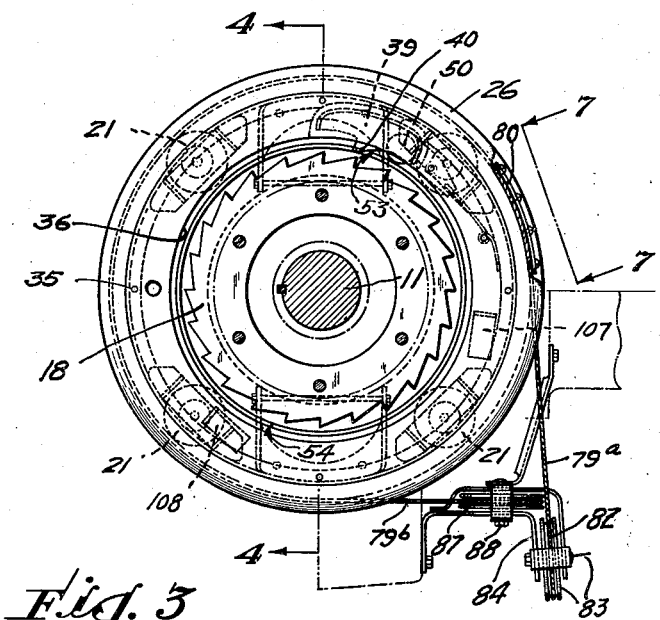
Fig. 3 is an enlarged transverse view in section and elevation as seen on the line 3—3 of Fig. 1 and shows the starting ratchet and the operating clutch associated therewith.
Figure 4:
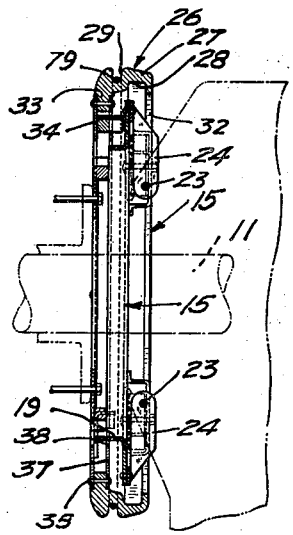
Fig. 4 is a view in central section as seen on the line 4—4 of Fig. 3 and shows the clutch mechanism in solid lines and indicating a fragmentary portion of the engine structure and the crankshaft by dotted lines.

The mounting ring 15 is secured to the engine by bolts 23 which pass through suitable openings on the engine structure and also through ears 24 carried on the back face of the ring structure 15. The outer circumferences of the rollers 21 are designed to be circumscribed in lieu thereof by a circle within which they are all included and all of which contact the circle. Thus, the rollers provide supporting bearings for an actuating ring 26. This ring, as shown in Figs. 3 and 4 of the drawings, has an outer annular portion 27 circumscribing a roller channel 28. The roller channel 28 is of a width to receive the rollers 21 and has a diameter along which all of the rollers 21 travel. By reference to Fig. 3 it will be seen that the rollers 21 thus support the actuating ring 26 concentrically with relation to the axis of the shaft 11 and permit the ring to move axially therearound. Formed in the outer circumference of the ring 26 is a groove 29 which receives an operating cable. This cable is designed to produce rotation of the actuating ring 26 as operated by either hand or foot power. Two methods of operation are shown in the drawings and will be explained hereinafter.

The rear side of the actuating ring 26 has a clearance opening 32. The forward side has an in-turned flange 33 which receives a guide plate 34. The guide plate 34 is secured in position by screws 35. The guide plate 34 is set into a counterbore in the face of the flange portion 33 and has a central opening 36 through it which is of greater diameter than the outside diameter of the cylindrical flange 19 on the mounting ring 15. Secured to the back of the flange 33 is an inner guide plate 37 which is spaced from the outer guide plate and is formed with a central opening 38. This opening accommodates the cylindrical portion 19 of the mounting ring 15. It will thus be seen that the outer guide plate 34 and the inner guide plate 37 are spaced apart so that a ratchet pawl 39 may be accommodated. This pawl is shown in detail in Fig. 13 of the drawings, where it will be seen that it is provided with a tooth 40 extending downwardly from the edge thereof and at a point midway the length of the pawl structure. Adjacent one end of the pawl is an opening 41 to accommodate a pivot pin 42. The pivot pin 42 extends through the guide plates 34 and 37. This provides a pivotal movement of the pawl in a plane normal to the axis of the shaft 11. An extension 43 is formed adjacent to the pivot and receives the end of a spring 44. This spring is looped around a pin 45 which passes through the outer and inner guide plates 34 and 37. An extension of the spring rests against the circumferential edge of the flange 33 of the actuating ring 26. The spring is wrapped around the pin 45 in such a manner as to tend to urge the portion 43 of the pawl structure outwardly and to this urge the pawl tooth 40 inwardly. The pawl 39 is designed to engage the teeth of the ratchet wheel 18 which is secured to the propeller hub 12 or to the shaft 11. The portion of the pawl 39 which extends oppositely from the previously described portion 43 is generally indicated at 47. This is a flat metal member substantially arcuate and formed intermediate its lower edge with the tooth 40. The edge of the portion 47 opposite that carrying the tooth is curved longitudinally, as indicated at 48. Extending along this edge is a roller retaining flange 49. This flange not only extends along the edge as indicated in Fig. 13 but overhangs the pawl, as indicated in Fig. 12. The overhanging portion therefore cooperates with the cylindrical flange 19 of the mounting ring 15 to provide a confined space within which a roller disc 50 may be retained. By reference to Fig. 12 it will be seen that the roller disc 50 fits between the portion 47 of the pawl structure 39 and the plate 16 of the mounting ring 15 and that its rounded edge 51 fits within the fillet 52 occurring between the plate 16 and the cylindrical extension 19. The cylindrical extension 19 of the mounting ring 15 has a cutaway portion 19' which extends circumferentially from a point 53 to a point 54, as indicated in Fig. 5 of the drawings. The width of the cutaway portion 19' agrees substantially with the width of the portion 47 of the pawl 39. This makes it possible for the pawl tooth 40 to swing inwardly and to engage the ratchet wheel 18. The roller disc 50 will at all times travel along the outer circumference of the cylindrical flange 19 and will be limited in its movement with relation to the member 49 by an inwardly curved portion 55 at one end of the member 49 and an inwardly curved portion 56 at the opposite end of the member 49.

By reference to Fig. 12 of the drawings it will be seen that the flange 49 extends inwardly toward the plate 16, and that this extension is greater than the width of the space between the guide plates 34 and 37. In order to accommodate this extension the guide plate 37 is cut away as indicated at 57 to allow the pawl 39 to swing on the pivot pin 42. Attention is directed to the fact, as particularly shown in Figs. 9 and 10 of the drawings, that the plate 49 with its curved ends 55 and 56 is so designed as to form a tapered throat, generally indicated at 58, which will occur between the outer circumference of the cylindrical flange 19 and the member 49 when the pawl 39 has swung inwardly to its engaging position and the free edge of the portion 56 has moved into substantial contact with the circumference of the member 19. This insures that a clutch action will take place to cause the roller disc 50 to retract the pawl from engagement with the teeth of the ratchet wheel 18 in a manner to be hereinafter described.

Figures 1, 2:
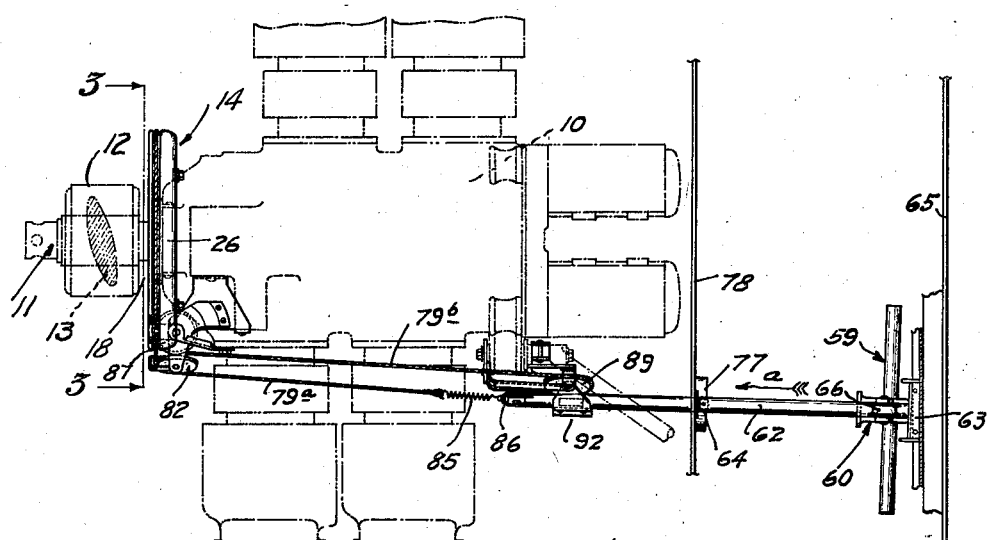
Figure 1 is a view in plan indicating a conventional airplane engine in dotted lines and showing the starting mechanism with which the present invention is concerned.
Fig. 2 is a view in side elevation indicating an airplane engine in dotted lines and showing the details of construction of the starting mechanism installed thereupon.

The actuating ring 26 is intended to be rotated by means operated by hand or foot power. As shown in the drawings, foot power is utilized. The structure involved includes a treadle bar 59 which extends horizontally as shown in Figs. 1 and 2 of the drawings. This bar is mounted on a fitting 60 which is formed with a pair of vertical arms 61 spaced apart and intended to accommodate a guide rod 62. The guide rod 62 extends substantially horizontally although it is slightly inclined downwardly and forwardly from a bracket 63 to a fitting 64. The bracket 63 is carried by the instrument board frame structure 65. Disposed between the arms 61 and resting upon the guide rod 62 is a grooved pulley 66 mounted upon a pivot pin 67. The pulley tends to guide the treadle bar 59 in its path and acts to prevent it from tilting from its horizontal position. At the lower end of the fitting 60 is a bearing 68 through which a tubular member 69 extends and within which it is secured by set screws 70. Extending into the tubular member 69 and through an opening 71 in the end of the bearing 68 is a rod 72. This rod is provided with a head 73 at its free end and is fastened to the bracket 63 by a nut 74. Interposed between an end shoulder 75 within the bearing 68 and a shoulder on the head 73 is a recoil spring 76. This spring acts to restore the fitting 60 and the treadle 59 to their normal retracted positions when pressure is relieved from the treadle. The tubular thrust member 69 is guided through a non-metallic bearing pad 77 carried on the partition structure 78. It is intended that the thrust member 69 shall engage a cable and produce rotation of the actuating ring 26. The preferred form of this structure is shown in Figs. 1 and 2 of the drawings, while a modification is shown in Figs. 17 and 18. In the form of the invention shown in Figs. 1 and 2 a continuous length of cable is looped around the actuating ring 26 and lies within the groove 29. At a point intermediate the ends of this cable it is secured in position by a fastening plate 80 which has a series of perforations through it to receive fastening screws 81. These screws are threaded into the actuating ring 26 and will hold the cable against movement. The cable will thus be in effect divided into two lengths, one indicated at 79ª which extends around the actuating ring 26 in a clockwise direction and is led around a guide pulley 82. The guide pulley 82 is disposed substantially vertically and is mounted upon a pin 83. The pin 83 is carried by a bracket 84 secured in a suitable position upon the engine 10. The length of cable 79ª is led beneath the pulley 82 and is attached at its end to a helical spring 85 which in turn is secured to a fastening 86 at the end of the thrust tube 69. The opposite length of cable is designated at 79ᵇ and it is led around the actuating ring 26 in a counter-clockwise direction. It passes around a guide pulley 87 mounted upon a vertical pivot pin 88 which is carried by the bracket 84. This length of cable is led around a pulley 89 which is mounted upon a horizontal pivot pin 90. The horizontal pivot pin 90 is carried by a bracket 91 secured to the frame of the engine 10. The end of the length 79ᵇ of the cable is connected to the thrust tube 69 by the fastening 86 and thus while the cable length 79ᵇ is drawn in the cable line 79ª is payed out.

In order to hold the thrust tube 69 firmly a guide bracket 92 is provided as shown particularly in Fig. 22 of the drawings. Here it will be seen that the bracket 91 is provided with an arm member 93 through which the pivot pin 90 extends to support the pulley 89 and also a bracket member 94 which extends beneath the thrust tube 69 and then upwardly to receive the pivot pin 90 of the pulley 89. Mounted upon the members 90 and 94 are wear strips 95, 96 and 97. These strips are preferably made of non-metallic material, such as fiber, and will act to guide the thrust tube 69 as it reciprocates.

In the form of the invention shown in Figs. 17 and 18 of the drawings the cable length 79ª is led around a tension pulley 98. This pulley is mounted upon a pivot shaft 99 carried by a bracket 100 and is shown particularly in Fig. 19 of the drawings. Here it will be seen that a coil spring 101 is wrapped around hub 102 of the pulley and is secured at one end by a screw 103. The opposite end of the spring 101 is fastened within a case 104. This coil spring tends to rotate the pulley 98 in a clockwise direction. A radial slot 105 is formed at a point in the circumference of the pulley 98 and its inner end is enlarged to receive a fastening member 106 which is secured to the end of the cable length 79ª. The cable length 79ᵇ is carried around pulley 87, as previously described, and will be connected directly to the fastening 86 on the end of the thrust tube 69.

In operation of the present invention, the structure is assembled as here shown and in the preferred form of the invention the cable 79 is arranged as indicated in Figs. 1 and 2 of the drawings. When it is desired to start the engine 10, the feet of the pilot are placed on the treadle bar 59 at opposite sides of the guide 62. In this position the knees of the pilot are bent and drawn toward the pilot's body. An action is then made to simultaneously straighten out both legs. This will force the thrust rod 69 in the direction of the arrow a, as indicated in Fig. 2 of the drawings. As a result the cable length 79ᵇ will be pulled in the direction of the arrow b, as shown in Fig. 2 of the drawings, and the actuating ring 26 will be rotated in the direction of the arrow c, as shown in Fig. 9 of the drawings. Simultaneously, the cable length 79ª will move in a counter-clockwise direction, as indicated by the arrow d in Fig. 2 and other figures of the drawings.

It will be understood that prior to the actuation of the thrust tube 69 the ratchet wheel 18 will be motionless and the actuating ring 26 and the pawl 39 will be in the position shown in Fig. 8 of the drawings. In this position the actuating ring 26 will be yieldably pulled in a clockwise direction by the tension spring 85, as shown in Fig. 2 of the drawings, or the coil spring 101 as shown in Fig. 19. The rear inclined face of the pawl tooth 40 will be drawn against the edge 53 of the cutaway portion 19' of the cylindrical extension 19, and thus the pawl will be held out of engagement with the teeth of the ratchet wheel 18. Attention is directed to the fact that in the normal inactive position of the actuating ring the pawl has moved in a clockwise direction over the plane of the longitudinal center of the shaft 11, and at this time the roller disc 50 will have moved by gravity along the cylindrical extension 19 until it has moved against the end member 55 of the overhanging plate 49. It will also be noted that due to the shape of the plate 49 considerable clearance will occur between the roller 50 and the member 49.

When the foot treadle 59 is moved in the direction of the arrow a the thrust tube 69 will move in a similar direction toward the dotted line position as indicated in Fig. 2. During this movement the cable length 79<sup>b</sup> will be drawn around the pulley 89 as well as the pulley 87 and will cause the acutating ring 26 to rotate in the direction of the pull. As this occurs the pawl 39 will move in a counterclockwise direction over the vertical plane which intersects the axis of the shaft 11, and as this takes place the rear face of the pawl tooth 40 will slide downwardly along the shoulder 53 of the cutaway portion 19' of the cylindrical extension 19, so that the pawl will swing inwardly around its pivot pin 42 as urged by the spring 44. It will be noted that there is sufficient clearance between the member 49 and the cylindrical extension 19 near the pivoted end of the pawl 47. This will permit the roller 50 to roll freely toward the end 55 as the pawl passes over the center of the cylindrical extension 19 and to roll toward the end 56 during the starting stroke. As the actuating ring 26 moves in the direction of the arrow c, as shown in Fig. 9 of the drawings, the pawl 39 will swing downwardly and dispose the tooth 40 in engagement with a tooth of the ratchet wheel 18. This engagement will continue while imparting rotation to the ratchet wheel in the direction of the arrow e, as shown in the drawings.

When the thrust tube 69 has reached the end of its stroke, as the fitting 60 strikes pad 77, the actuating ring 26 will not be rotated any further in the direction of the arrow c, and release of pressure upon the foot treadle 59 will cause the thrust tube 69 to move in a counter-direction to that indicated by arrow a as urged by the expansion of spring 76 within the tube 69. During this operation the actuating ring 26 will move in the direction of the arrow f, as shown in Fig. 11 of the drawings, while the cable length 79<sup>b</sup> will move in the direction of the arrow g, and the cable length 79<sup>a</sup> will move in the direction of the arrow h, as shown in Fig. 11. It will be assumed that the operation started the engine so that the ratchet wheel 18 will continue to rotate in the direction of the arrow e. During the time that the actuating ring 26 moved in the direction of the arrow c, as shown in Figs. 9 and 10, there was a tendency for the roller 50 to remain at the wide end of the throat 58 and near the stop member 55. When, however, the actuating ring 26 begins to rotate in the direction of the arrow f, as shown in Fig. 11, there will be a tendency for the roller 50 to roll downwardly into the narrow end of the throat 58 until it encounters the stop 56. This is due to the fact that the roller 50 is resting upon the cylindrical flange 19 and is held yieldably thereagainst by the overhanging portion 49 of the pawl. Thus, the roller 50 will rotate in the direction of the arrow indicated upon the roller in Fig. 11, and will thus wedge down to the free end of the pawl 39 to the position shown in Fig. 11. As the roller 50 reaches this position it will withdraw the pawl tooth 40 from engagement with the tooth of the ratchet wheel 18 and will automatically release the mechanical starting mechanism from the ratchet wheel. The counter rotation of the actuating ring 26 in the direction of the arrow f will continue until the thrust tube 69 is restored to its original position, as indicated in Fig. 2 of the drawings. In the form of construction shown in Figs. 1 and 2 of the drawings the reverse movement is made by pulling upon the cable length 79<sup>a</sup> in direct connection with the thrust rod 69. In the form of the invention shown in Figs. 17 and 18 the cable length 79<sup>a</sup> is drawn in the direction of the arrow h by action of the coil spring 101 within the case 104. Attention is directed to the fact that the roller acts to retract the tooth 40 from engagement with the ratchet wheel in a very short distance of travel of the actuating ring 26 in the direction of the arrow f, and that it is not necessary for the tooth 40 to engage the shoulder 53 of the cutaway portion 19' in order to retract the tooth 40 from engagement with the ratchet wheel teeth. The shoulder 53 merely provides a convenient stop against which the already retracted tooth 40 may rest and by which it will be held against accidental engagement with the ratchet wheel when the starting device is not in use. The arrangement here shown, therefore, does not require definite abutments against which parts must move in order to retract the tooth 40 of the pawl 39. The advance action and the retracting action of the tooth 40 is caused by relative movement of the actuating ring and the roller 50 to the cylindrical extension 19 of the mounting ring 16. It is not even necessary to make a complete stroke of the foot treadle in either direction in order to engage or disengage the pawl from the ratchet.

The relative movement of the actuating ring 26 to the cylindrical extension 19 of the mounting ring 16 performs another new and novel action, that is to automatically produce disengagement of the pawl 39 and the ratchet wheel 18 in the event of backfire of the engine. Under such circumstances the ratchet wheel 18 will rotate in a counter direction to the arrow c, as indicated in the drawings, and in doing so it will rotate the actuating ring 26 in the direction of the arrow f shown in Fig. 11. This action of course is beyond the control of the pilot and if a rigid connection existed between the ratchet wheel 18 and the thrust rod 69 with its foot treadle 59 the pilot might be seriously injured as the thrust tube 69 was forcibly retracted. This structure prevents injury to the pilot or the starting mechanism. In explanation it might be assumed that when the actuating ring 26 with the ratchet had reached the position shown in Fig. 10 of the drawing the engine backfired. The ratchet wheel 18 would then instantly rotate in a counter-direction to the arrow e, and the pawl 39 with the ring 26 would be carried in a counter-direction to the arrow c in Fig. 10. The roller 50 would then move along the cylindrical extension 19 of the mounting plate and at least by the time the pawl had reached the position shown in Fig. 11 the roller would have acted to retract the tooth 40 of the pawl from engagement with the tooth of the ratchet wheel 18. The mounting ring 15 carries a stop 107 which may be engaged by the stop 108, carried upon member 34, in the event the cable 79<sup>a</sup> should pull the ring assembly 26 too far in a clockwise direction.

It will thus be seen that the mechanical engine starting mechanism here shown is simple in construction, may be easily installed upon standard engine models without alteration of existing parts, and will act automatically to grip and release a starting ratchet wheel by hand or foot power, and will insure that the force imparted when the engine backfires will not produce any injurious effect but will act automatically to disconnect the starting mechanism from the starting ratchet wheel.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

A mechanical starting device for internal combustion engines comprising a ratchet wheel fixed to the engine shaft, a mounting plate fixed to body of the engine and having a central opening through which the engine shaft extends and which is concentric therewith, a series of rollers carried by said mounting plate, the axes of said rollers being parallel to the engine shaft and being disposed in spaced relation to each other along a circle concentric with said engine shaft, an actuating ring having an annular trackway to receive said rollers whereby said ring will be supported to rotate around the axis of the engine shaft, a pawl pivotally mounted upon said actuating ring and adapted to swing relative thereto toward and away from engagement with the ratchet wheel, yieldable means tending to urge the pawl toward its engaging position, an annular flange carried by the mounting plate to circumscribe the ratchet wheel and to occupy a position between the ratchet wheel and the actuating ring, and means moving along said flange and frictionally engaging the pawl whereby when the pawl travels in a cranking direction it will be permitted to engage a tooth of the ratchet wheel and will positively retract the pawl from engagement with the tooth of the ratchet wheel upon initiation of return travel of the pawl to its initial position.

WALTER H. RIGHTER.

REFERENCES CITED

The following references are of record in the file of this patent:

UNITED STATES PATENTS

| Number | Name | Date |
|---|---|---|
| 164,413 | Barnes | June 15, 1875 |
| 934,576 | Seyler | Sept. 21, 1909 |
| 1,004,635 | Dunkel | Oct. 3, 1911 |
| 1,066,014 | Hodgkinson | July 1, 1913 |
| 1,099,685 | Bennett | June 9, 1914 |
| 1,171,170 | Casgrain | Feb. 8, 1916 |
| 1,229,147 | Sandbo | June 5, 1917 |
| 1,389,108 | Warner | Aug. 30, 1921 |
| 2,266,098 | Trader | Dec. 16, 1941 |